(12) United States Patent
Sone et al.

(10) Patent No.: US 10,215,207 B2
(45) Date of Patent: Feb. 26, 2019

(54) SUPPORT MEMBER (71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Kosuke Sone, Mie (JP); Osamu Nakayama, Mie (JP); Tetsuji Tanaka, Mie (JP); Mitsutoshi Morita, Mie (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/747,652

(22) PCT Filed: Jul. 19, 2016

(86) PCT No.: PCT/JP2016/071115
§ 371 (c)(1),
(2) Date: Jan. 25, 2018

(87) PCT Pub. No.: WO2017/026232
PCT Pub. Date: Feb. 16, 2017

(65) Prior Publication Data
US 2018/0216643 A1 Aug. 2, 2018

(30) Foreign Application Priority Data
Aug. 7, 2015 (JP) .................. 2015-156746

(51) Int. Cl.
H02G 15/06 (2006.01)
F16B 5/02 (2006.01)
(Continued)

(52) U.S. Cl.
CPC ............. *F16B 5/025* (2013.01); *F16B 5/02* (2013.01); *F16B 5/0216* (2013.01);
(Continued)

(58) Field of Classification Search
CPC .......... B29C 45/14655; B60R 16/0215; B60R 16/0231
See application file for complete search history.

(56) References Cited

U.S. PATENT DOCUMENTS 4,518,138 A * 5/1985 Stutenkemper ........... F16L 3/12
248/220.21
4,705,244 A * 11/1987 Saotome ................. F16L 3/223
248/222.51
(Continued)

FOREIGN PATENT DOCUMENTS

JP H10313520 A 11/1998
JP 2000078721 A 3/2000
(Continued)

OTHER PUBLICATIONS

International Search Report for Application No. PCT/JP2016/071115 dated Oct. 18, 2016; 6 pages.

*Primary Examiner* — Bradley Duckworth
(74) *Attorney, Agent, or Firm* — Reising Ethington, P.C.

(57) ABSTRACT

A support member is for supporting a conductive member such as an electrical wire and is for installation in an automatic transmission, and includes a main body portion made of a resin and plates that are made of a metal and are to be fixed to the body of the automatic transmission via bolts. The main body portion has attachment portions to
(Continued)

which the plates are attached, and elastic lock portions that project within the attachment portions and have elasticity capable of restricting removal of the plates from the attachment portions.

2 Claims, 7 Drawing Sheets (51) Int. Cl.
*F16B 5/06* (2006.01)
*F16H 61/00* (2006.01)
*F16L 3/233* (2006.01)
*H02G 3/30* (2006.01)

(52) U.S. Cl.
CPC .............. *F16B 5/0241* (2013.01); *F16B 5/06* (2013.01); *F16B 5/0635* (2013.01); *F16H 61/00* (2013.01); *F16L 3/233* (2013.01); *H02G 3/30* (2013.01)

(56) References Cited

U.S. PATENT DOCUMENTS

| | | | | |
|---|---|---|---|---|
| 4,790,204 A | * | 12/1988 | Tury | F16H 59/12 73/866.1 |
| 5,534,665 A | * | 7/1996 | Long | B60R 16/0215 174/68.1 |
| 5,804,770 A | * | 9/1998 | Tanaka | H01M 2/206 174/138 F |
| 6,042,062 A | * | 3/2000 | Sugiyama | B60R 16/0215 174/72 A |
| 6,903,275 B1 | * | 6/2005 | Jetton | B60R 16/0215 174/503 |
| 7,141,737 B2 | * | 11/2006 | Nakamura | B60R 16/0215 174/72 A |
| 7,488,904 B2 | * | 2/2009 | Maegawa | B29C 45/1671 174/521 |
| 8,991,774 B2 | * | 3/2015 | Hajduch | B65D 63/00 248/220.22 |
| 9,151,319 B2 | * | 10/2015 | Gotou | F16B 43/003 |
| 9,166,387 B2 | * | 10/2015 | Murakoshi | B60R 16/0215 |
| 9,227,578 B2 | * | 1/2016 | Soh | B60R 16/0215 |
| 9,521,762 B2 | * | 12/2016 | Sato | H05K 5/0073 |
| 9,643,544 B2 | * | 5/2017 | Kawashima | B60R 16/0215 |
| 9,653,901 B2 | * | 5/2017 | Miyamoto | F16L 3/1075 |
| 9,963,093 B2 | * | 5/2018 | Sone | F16H 61/00 |
| 2008/0123261 A1 | | 5/2008 | Maegawa et al. | |
| 2009/0017648 A1 | * | 1/2009 | Sano | H05K 5/0073 439/76.2 |
| 2014/0065468 A1 | * | 3/2014 | Nakayama | H01M 2/206 429/160 |
| 2015/0107894 A1 | * | 4/2015 | Hayashi | B60R 16/0215 174/72 A |
| 2015/0364872 A1 | * | 12/2015 | Nakayama | H01G 2/04 429/121 |
| 2016/0121815 A1 | * | 5/2016 | Lindner | B60R 16/00 248/65 |
| 2017/0175932 A1 | * | 6/2017 | Izawa | F16L 3/1075 |
| 2017/0250528 A1 | * | 8/2017 | Fujiki | H01B 7/0045 |

FOREIGN PATENT DOCUMENTS

| | | |
|---|---|---|
| JP | 2003092817 A | 3/2003 |
| JP | 2004208429 A | 7/2004 |
| JP | 2014199071 A | 10/2014 |

* cited by examiner

SUPPORT MEMBER

CROSS REFERENCE TO RELATED APPLICATIONS

This application claims the priority of Japanese patent application JP2015-156746 filed on Aug. 7, 2015, the entire contents of which are incorporated herein.

TECHNICAL FIELD

The present invention relates to a support member that supports a conductive member such as an electrical wire and is for installation in an automatic transmission.

BACKGROUND ART

Patent Document 1 (JP 2014-199071A) discloses a support member (holding plate) that supports an electrical wire and is for installation in an automatic transmission. The support member has a metal main body portion that has been bent into a predetermined shape. The main body portion has bolt insertion holes that have a circular opening, and is fixed to the body (casing) of the automatic transmission via bolts inserted through the bolt insertion holes.

SUMMARY

Incidentally, in consideration of the ability to assemble and process electrical wires, there is sometimes demand for the main body portion to be molded from resin. However, given that an automatic transmission is a harsh use environment including high-temperature oil, if the main body portion is made of resin, the amount of deformation of the main body is larger than that of the bolts due to the difference in the coefficients of linear expansion between them, and there are cases where the bolts readily become loose. In view of this, a configuration can be employed in which a metal collar is integrally attached to the main body portion by insert molding, and the bolts are inserted through the metal collar. However, when a metal collar formed by cutting processing is attached to the main body portion by insert molding, there is a problem that the manufacturing cost rises.

The present design was achieved in light of the aforementioned circumstances, and an object of the present design is to reduce the manufacturing cost of a support member for installation in an automatic transmission.

One aspect of the present design is a support member for supporting a conductive member and for installation in an automatic transmission, the support member including: a main body portion made of a resin; and a plate that is made of a metal and is to be fixed to a body of the automatic transmission via a bolt. The main body portion has an attachment portion to which the plate is attached, and an elastic lock portion that projects within the attachment portion and has elasticity capable of restricting removal of the plate from the attachment portion, the plate has a flat plate-shaped plate main body that is provided with an insertion hole through which the bolt can be inserted, and the elastic lock portion has a locking surface that, in a state where the plate is supported by the attachment portion, opposes a side edge portion of the plate main body across a gap, and restricts removal of the plate from the attachment portion while also allowing movement of the plate main body in the gap.

Removal of the plate from the attachment portion is restricted by the elastic lock portion, and the plate is fixed to the body via the bolt, and therefore a rise in cost can be suppressed in comparison with a case where a metal collar is insert-molded in the attachment portion. Also, the plate can move within the range of a backlash formed between the plate and the elastic lock portion, thus making it possible to absorb a difference in the coefficients of linear expansion of the resin main body portion and the metal plate.

DESCRIPTION OF EMBODIMENTS

The following describes a preferable aspect of the present design.

The attachment portion has a guide groove that extends in an attachment direction of the plate, and the elastic lock portion is provided on a side surface of the attachment portion, the side surface being on a side opposite to a side on which the guide groove is formed. According to this configuration, the plate can be attached with one side of the plate positioned on the guide groove side and the other side of the plate positioned on the elastic lock portion side, thus making it possible to prevent the elastic lock portion from applying excessive elastic reaction force, and the ease of the attachment operation is superior.

EMBODIMENT

An embodiment will be described below with reference to FIGS. 1 to 7. A support member 10 of this embodiment includes a main body portion 20 that is made of a synthetic resin and serves as a wiring board for installation in an automatic transmission of an automobile, and a metal plate 60 for attachment of the main body portion 20 to a body 50 (including a case) of the automatic transmission via bolts 40. Note that in the following description, the up-down direction is based on the state of being installed in the automobile.

Figure 1:
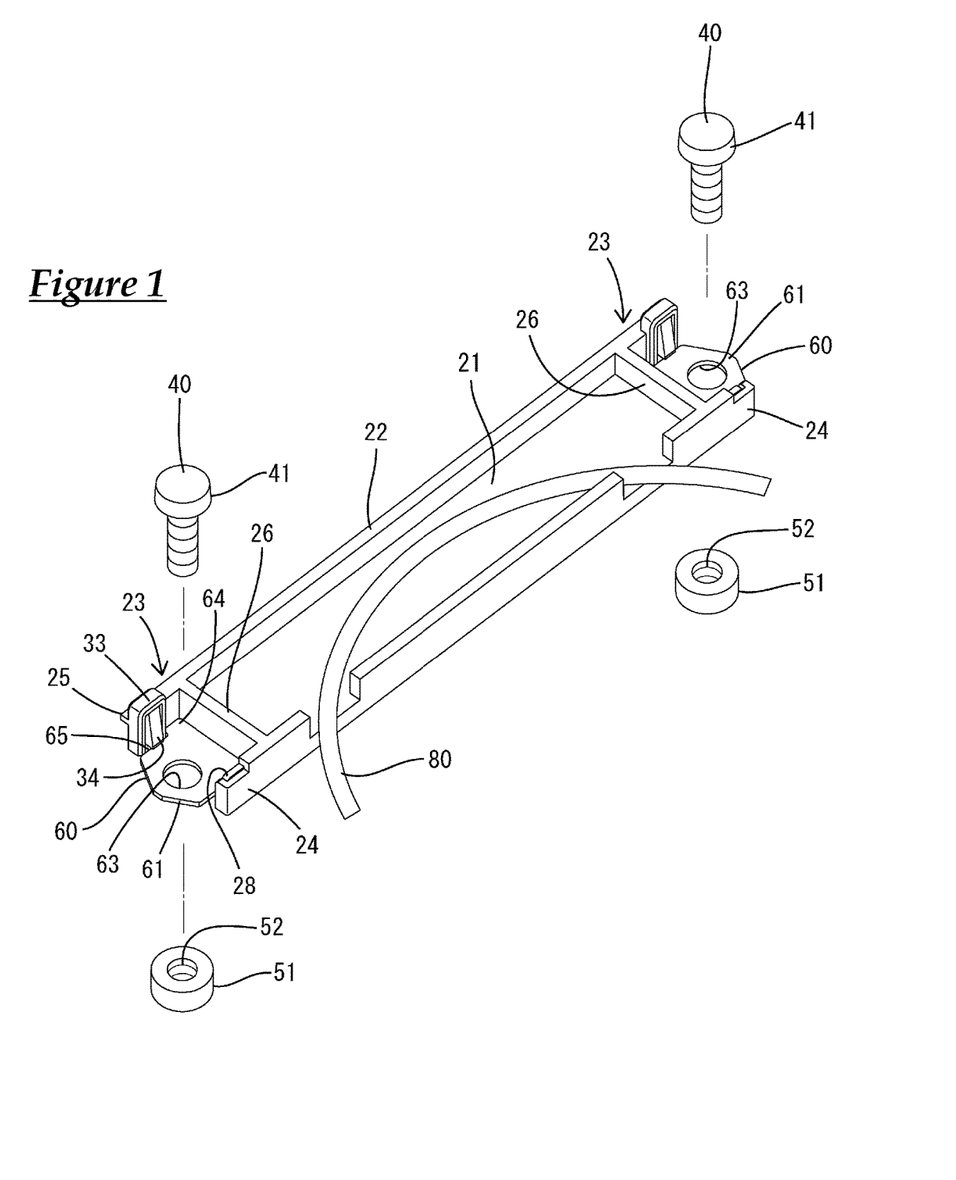
FIG. 1 is a perspective view of a support member according to an embodiment.

As shown in FIG. 1, the main body portion 20 is a plate-shaped member that is elongated in the front-back direction (length direction), and has a flat wire support surface 21 that supports an electrical wire 80 on an upper surface. The outer peripheral portion of the main body portion 20 is defined by rib-shaped partition portions 22 that define two sides of the wire support surface 21.

An attachment portion 23 is provided in each of two end portions at the front and back of the main body portion 20. The attachment portions 23 each have a pair of left and right side walls 24 and 25 that are continuous with the partition portions 22, and an end wall 26 that is orthogonal to the two side walls 24 and 25 and separates the attachment portion 23 from the wire support surface 21. Each attachment portion 23 is open on the side that the end wall 26 faces and the upper and lower sides, and a plate 60 is inserted through the upper open portion and held between the two side walls 24 and 25 and the end wall 26.

Figure 2:
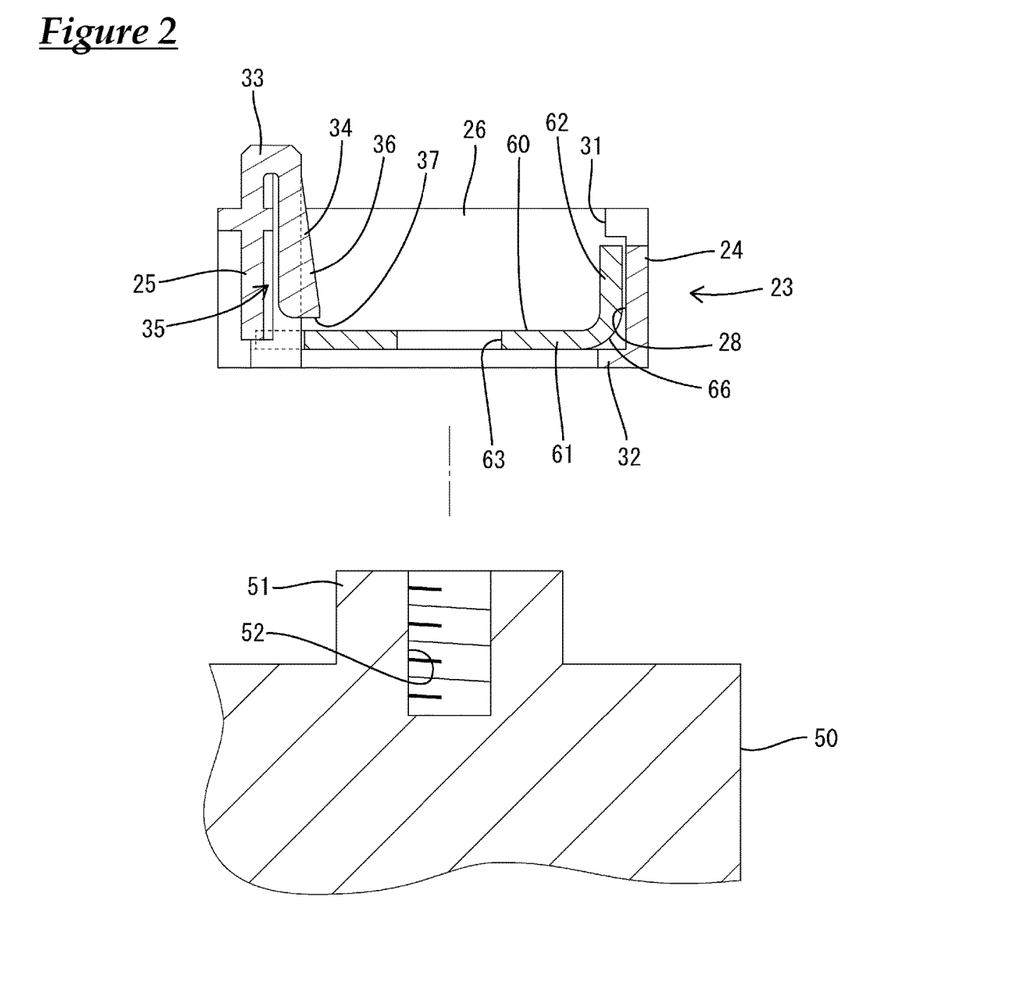
FIG. 2 is a front-view sectional diagram of the support member before attachment to a body of an automatic transmission.
Figure 4:
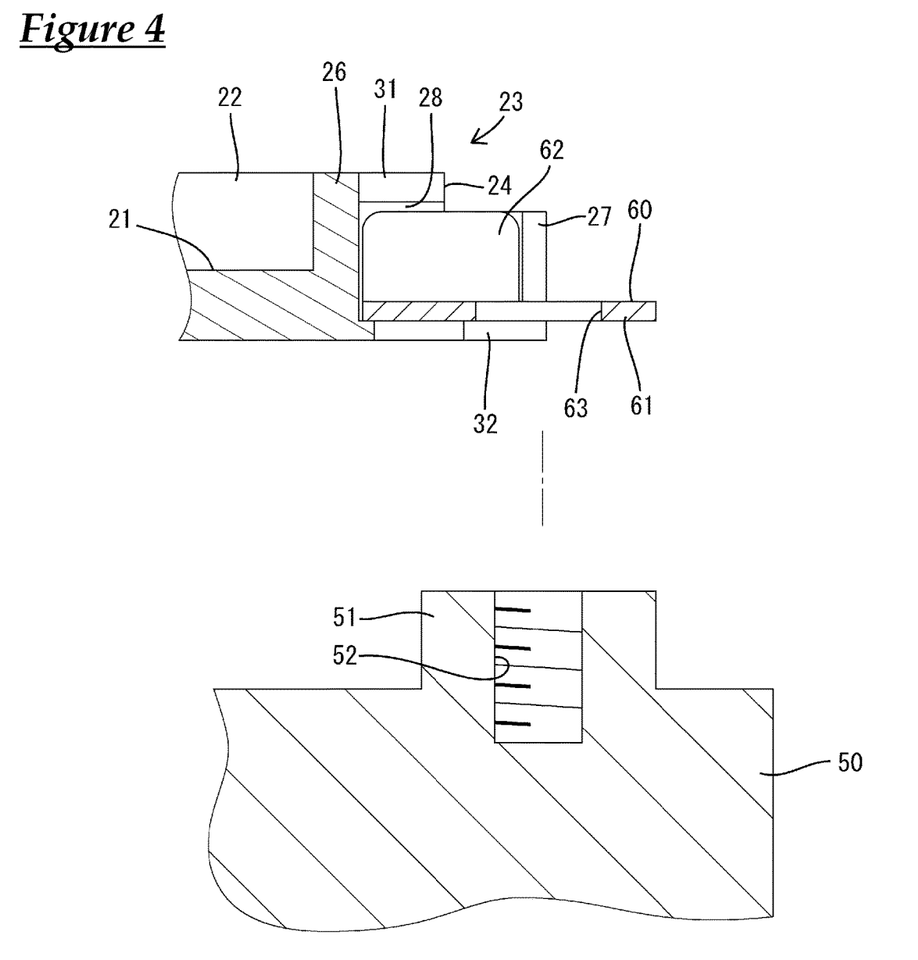
FIG. 4 is a side-view sectional diagram of the support member before attachment to the body of the automatic transmission.

As shown in FIG. 2, out of the two side walls 24 and 25, the one side wall 24 has a guide groove 28 that extends in the up-down direction and is located between the end wall 26 and a guide rib 27 on the leading end side (see FIG. 4). Also, as shown in FIG. 4, the one side wall 24 has an upper cover portion 31 that obstructs the half of the upper opening of the guide groove 28 that is on the end wall 26 side, and a lower cover portion 32 that obstructs the half of the lower opening guide groove 28 that is on the leading end side. The upper cover portion 31 and the lower cover portion 32 are each shaped as a rib that is elongated in the front-back direction, and are arranged at positions that are shifted in the front-back direction relative to each other.

As shown in FIG. 4, the guide rib 27 is shaped as a rib that is elongated in the up-down direction, and the lower end thereof is integrally connected to the lower cover portion 32. The upper cover portion 31 is integrally connected to the upper end of the end wall 26. Note that a later-described rising piece 62 of the plate 60 is inserted into the guide groove 28.

As shown in FIG. 1, out of the two side walls 24 and 25, the other side wall 25 has a door frame-shaped (upside-down "U" shaped) frame portion 33 that protrudes inward at a position toward the leading end, and has a lower support portion (not shown) that is located at a position adjacent to the frame portion 33 in the lower end portion toward the end wall 26. The upper side portion of the frame portion 33 is arranged at a position one level higher than the attachment portion 23.

As shown in FIG. 2, the other side wall 25 has a protrusion-shaped elastic lock portion 34 that projects in a cantilevered manner downward from the upper side portion of the frame portion 33. The elastic lock portion 34 is arranged at a position opposing the lower half of the guide groove 28 that is on the leading end side, and can undergo bending deformation inward and outward with the upper side portion of the frame portion 33 serving as the fulcrum. A bending space 35 that allows bending movement of the elastic lock portion 34 is ensured between the elastic lock portion 34 and the side surface portion that the elastic lock portion 34 faces inside the frame portion 33. Also, the elastic lock portion 34 has a tapered inclined surface 36 that is inclined inward while extending downward, and a locking surface 37 that is connected to the lower end of the inclined surface 36 and faces the lower end opening of the attachment portion 23 from above, and the elastic lock portion 34 is formed so as to gradually increase in thickness toward the lower end.

As shown in FIG. 2, the plate 60 is a plate member that has an L-shaped cross-section, and has a flat plate-shaped plate main body 61 and a rising piece 62 that rises up from one side edge of the plate main body 61. This plate 60 is formed without performing cutting, and is formed by performing punching on a metal plate in press processing and then performing bending processing.

Figure 7:
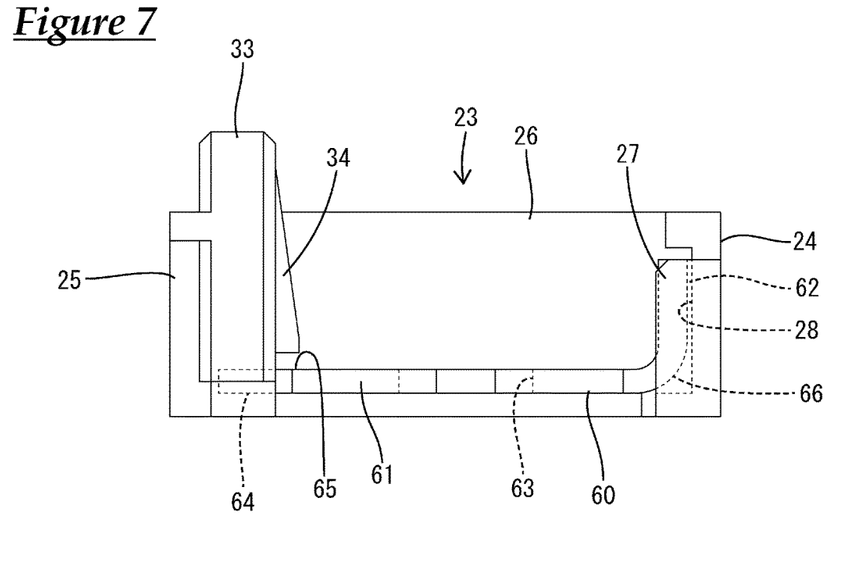
FIG. 7 is a front view of the support member.

The plate main body 61 is provided with a circular insertion hole 63 through which a bolt 40 can be inserted. As shown in FIGS. 1 and 7, the other side edge of the plate main body 61 has a protruding piece 64 that is supported by the lower support portion of the attachment portion 23, and also has a straight edge portion 65 that extends along the front-back direction and is connected to the protruding piece 64 in a step-like manner at a position toward the leading end.

The rising piece 62 is shaped as a rectangular plate, and substantially the entirety thereof is accommodated in the guide groove 28. As shown in FIG. 2, a base end portion 66 of the rising piece 62 is connected to the plate main body 61 with a curved surface shape.

Next, actions and effects of the present embodiment will be described.

When assembly is performed, the plates 60 are each inserted into a respective attachment portion 23 of the main body portion 20 from above. At this time, the plate 60 is tilted such that the side edge portion toward the rising piece 62 of the plate main body 61 is somewhat downward, and then the plate 60 is pulled down in this state. Accordingly, the straight edge portion 65 of the plate main body 61 slides over the inclined surface 36 of the elastic lock portion 34, and the elastic lock portion 34 undergoes bending deformation into the bending space 35. Also, in the process of pulling down the plate 60, the orientation of the plate main body 61 is gradually corrected so as to progressively become horizontal, and the rising piece 62 is fitted into the guide groove 28.

In this way, if the plate 60 is properly inserted into the attachment portion 23, the elastic lock portion 34 can undergo elastic restoration and lock the straight edge portion 65 of the plate main body 61 from above, and the protruding piece 64 is supported by the lower support portion from below. If the plate 60 is lifted up from this state, the elastic lock portion 34 abuts against the straight edge portion 65 of the plate main body 61, thus restricting further lifting (removal) of the plate 60.

As shown in FIG. 7, in the state where the plate 60 is placed on and supported by the lower support portion and the lower cover portion 32, the locking surface 37 of the elastic lock portion 34 is arranged opposing the straight edge portion 65 of the plate main body 61 across a slight gap, and the upper cover portion 31 is arranged opposing the upper end of the rising piece 62 across a slight gap. Also, the rising piece 62 is arranged with play in the front-back direction between the end wall 26 and the guide rib 27 that define the guide groove 28 (see FIG. 4). Furthermore, the entirety of the plate 60 is arranged with play in the left-right direction between the two side walls 24 and 25 (see FIG. 2). Accordingly, the plate 60 is attached to the attachment portion 23 of the main body portion 20 in a state of being able to freely move in all directions.

Next, the support member 10 is attached to the body 50 of the automatic transmission. When attachment is performed, the attachment portions 23 are placed on the upper end surfaces of boss portions 51 that protrude from the upper surface of the body 50, and the insertion holes 63 of the plates 60, which are attached to the attachment portions 23, are aligned so as to be in communication with screw holes 52 of the boss portions 51. At this time, the plates 60 can move relative to the attachment portions 23, thus making it possible to absorb dimensional error during attachment.

Figure 3:
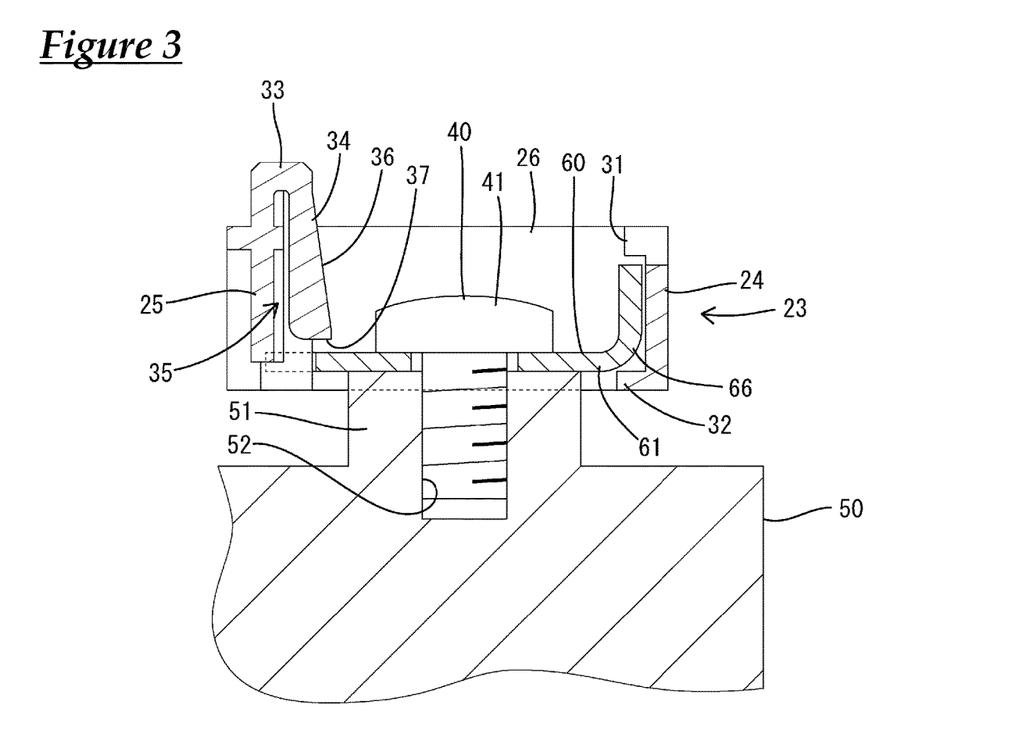
FIG. 3 is a front-view sectional diagram of the support member after attachment to the body of the automatic transmission.
Figure 5:
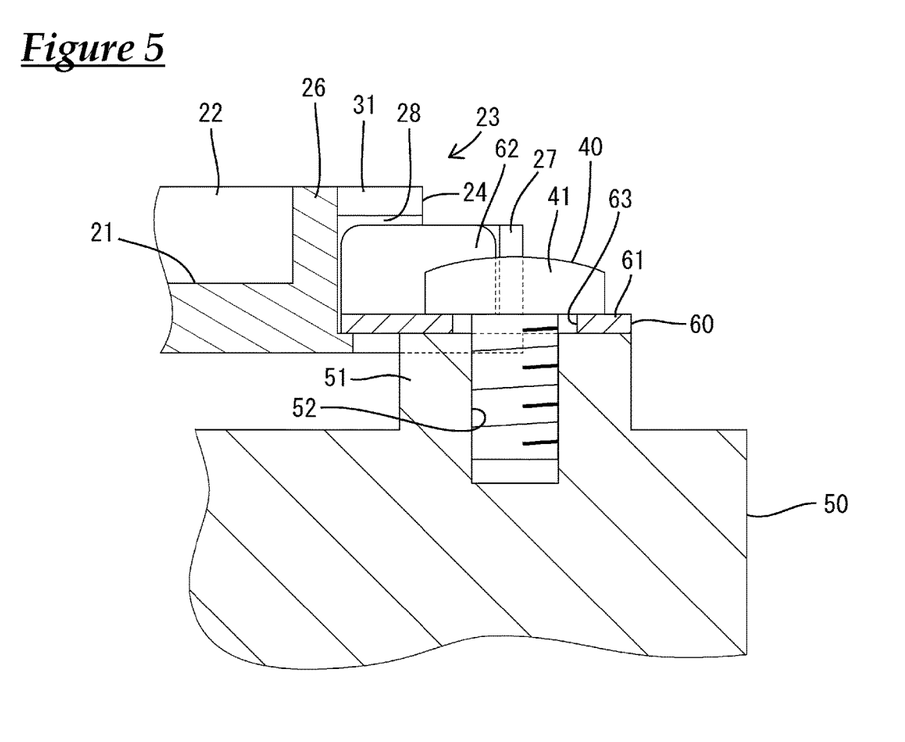
FIG. 5 is a side-view sectional diagram of the support member after attachment to the body of the automatic transmission.
Figure 6:
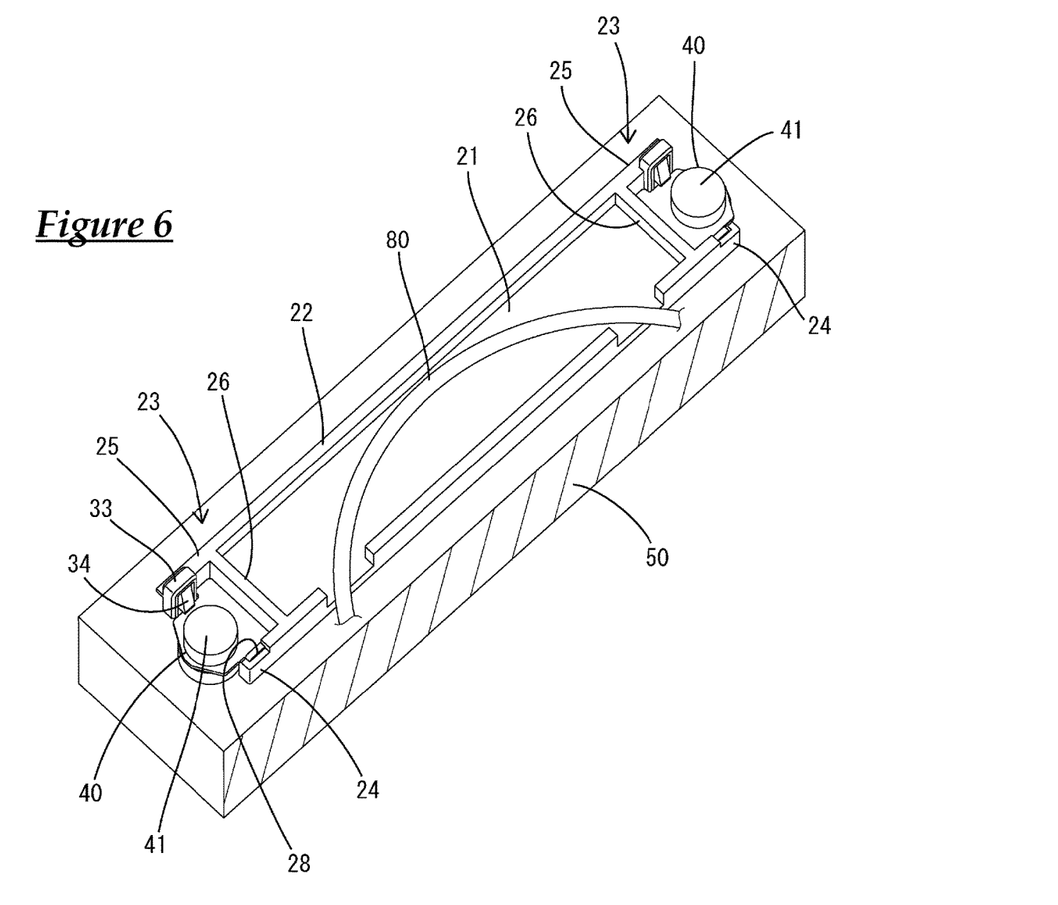
FIG. 6 is a perspective view of the support member after attachment to the body of the automatic transmission.

Next, the bolts 40 are inserted into the insertion holes 63 of the plate main bodies 61 from above, and the leading end portions of the bolts 40 are screwed into the screw holes 52. Accordingly, as shown in FIGS. 3 and 5, the plate main bodies 61 are tightly sandwiched in the up-down direction (plate thickness direction) between the upper end surfaces of the boss portions 51 and the head portions 41 of the bolts 40, and thus the plates 60 are fixed to the body 50, and the main body portion 20 is attached to the body 50 via the plates 60. Note that the bolts 40 referred to here are a concept including a screw member such as a small screw that is fastened with a screwdriver.

Incidentally, if a metal collar formed by cutting is used in place of the plates 60, and the metal collar is integrally insert-molded with the main body portion 20, the manufacturing cost of the metal collar itself is high, and moreover die equipment for insert molding is necessary, thus causing a situation in which the overall manufacturing cost increases.

In view of this, according to the present embodiment, the plates 60 are formed by press processing, and the main body portion 20 is merely formed using normal resin molding (injection molding), and therefore it is possible to suppress the overall manufacturing cost to a low level. Also, the plates 60 are attached to the attachment portions 23 of the main body portion 20 with a predetermined backlash, and therefore even if the deformation amount of the main body portion 20 is largely different from the deformation amount of the plates 60 in high-temperature oil in an automatic transmission due to the difference in the coefficients of linear expansion of the metallic plates 60 and the synthetic resin main body portion 20, the deformation amount of the plates 60 can be absorbed within the range of the backlash.

Also, the attachment portions 23 are each provided with the guide groove 28 and the elastic lock portion 34, and the plates 60 are each attached with one side of the plate 60 (the rising piece 62 side) positioned on the guide groove 28 side and the other side of the plate 60 (the protruding piece 64 and straight edge portion 65 side) positioned on the elastic lock portion 34 side, and therefore an unnecessarily large elastic reaction force is not applied by the elastic lock portion 34, and the ease of the attachment operation is superior.

Other Embodiments

The following briefly describes other embodiments of the present design.

The main body portion is not necessarily required to be a plate-shaped member, and may be a block-shaped member, for example.

The groove bottom portion that has the wire support surface of the main body portion may have a level difference in the height direction so as to extend along the shape of the body of the automatic transmission.

A structure is possible in which a facing ring such as a washer is placed between the plates and the head portions of the bolts.

A configuration is possible in which space for play of the elastic lock portion is not actively provided in the attachment portion, and the plate can merely move within the range of the gap that is naturally formed between the elastic lock portion and the plate due to the elastic structure of the elastic lock portion.

The elastic lock portion may be provided as a pair on the left and right side surfaces of the attachment portion, and the number and arrangement of the elastic lock portions can be set differently from the above embodiment.

The support member may be a member that supports a conductive member other than an electrical wire, such as a bus bar.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Support member
20 Main body portion
23 Attachment portion
28 Guide groove
34 Elastic lock portion
50 Body
60 Plate
80 Electrical wire
90 Bolt

The invention claimed is:

1. A support member for supporting a conductive member and for installation in an automatic transmission, the support member comprising:
   a main body portion made of a resin; and
   a plate that is made of a metal and is to be fixed to a body of the automatic transmission via a bolt,
   wherein the main body portion has an attachment portion to which the plate is attached, the attachment portion being defined at least by a first side wall and a second side wall that opposes the first side wall, and wherein a guide groove is provided on an inner surface of the first side wall that faces the second side wall, and wherein the second side wall has an elastic lock portion that projects within the attachment portion and has elasticity capable of restricting removal of the plate from the attachment portion,
   the plate has a rising piece and a flat plate-shaped plate main body that is provided with an insertion hole through which the bolt can be inserted, wherein an outer surface of the rising piece faces the inner surface of the first side wall in a state where the plate is supported by the attachment portion, and
   the elastic lock portion has a locking surface that, in the state where the plate is supported by the attachment portion, opposes a side edge portion of the plate main body across a gap, and restricts removal of the plate from the attachment portion while also allowing movement of the plate main body in the gap.

2. The support member according to claim 1, wherein the guide groove extends in an attachment direction of the plate.

\* \* \* \* \*